Nov. 17, 1931.  J. LARAMEE  1,832,641
TRACTOR HITCH
Filed Aug. 18, 1930
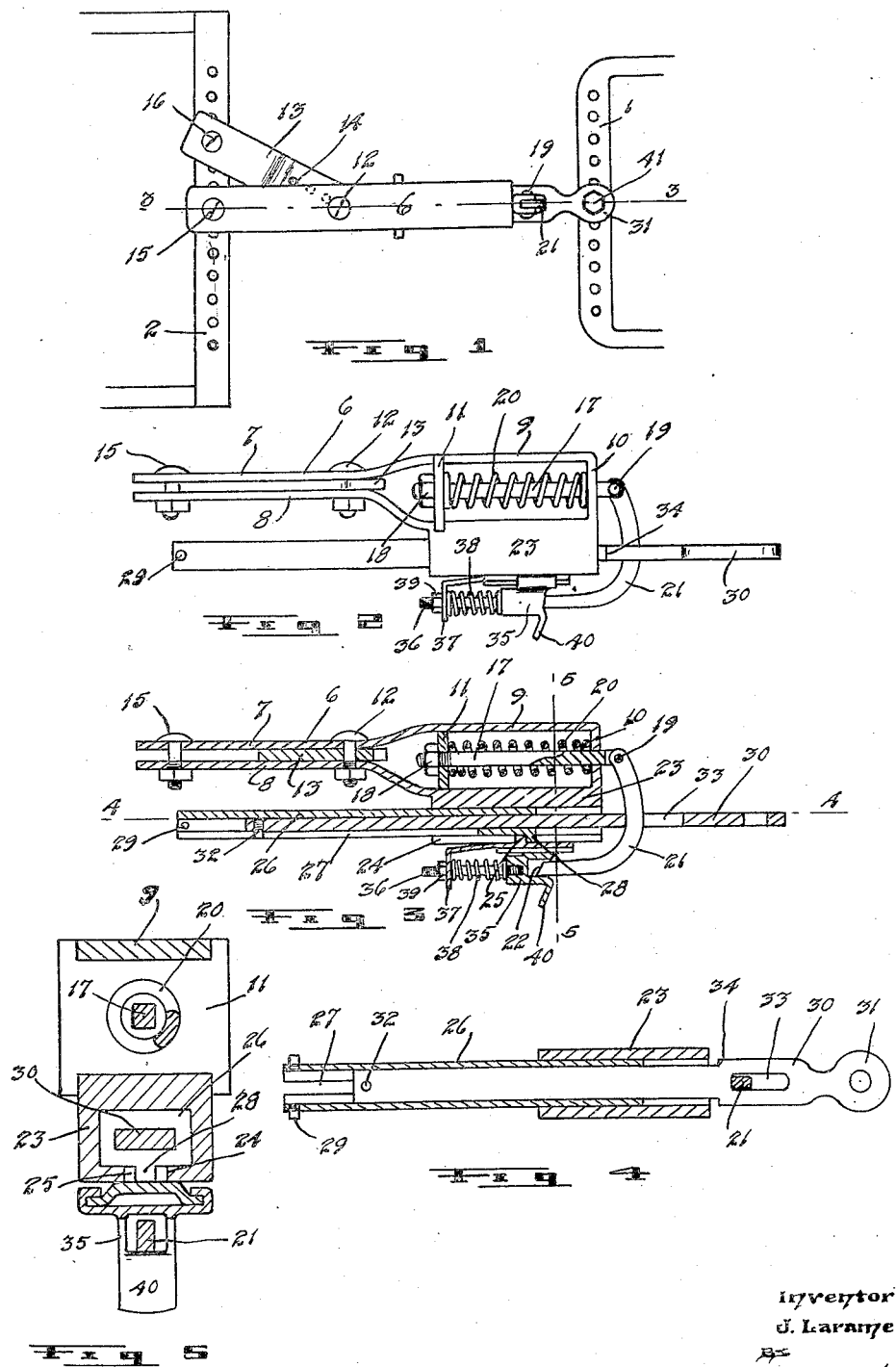
Inventor
J. Laramee Patented Nov. 17, 1931

1,832,641

UNITED STATES PATENT OFFICE

JOSEPH LARAMEE, OF HILTON, MANITOBA, CANADA

TRACTOR HITCH

Application filed August 18, 1930. Serial No. 476,106.

The invention relates to improvements in tractor hitches and an object of the invention is to provide a hitch for connecting a pulling vehicle such as a tractor to a drawn vehicle such as a plough and which is designed so that it will automatically release to free the drawn vehicle or tractor should the plough strike a damaging obstruction, provision being made so that the draft can be adjusted, thereby controlling the maximum pull required to release the hitch.

A further object is to construct the hitch so that upon the same being set off or actuated by an excessive load, it permits the tractor to move ahead a predetermined distance and without uncoupling the tractor from the plough, the distance so travelled by the tractor giving ample time for the attendant to stop the tractor and thereby avoid damaging the plough or hitch.

A further object of the invention is to provide a hitch which is so designed that it will automatically reset itself upon the tractor backing up towards the plough and which also can be utilized for backing up the plough by the tractor when desired.

A further object of the invention is to provide a hitch which renders it easy for one to clear the tractor while drawing a load, should it become mired, such being accomplished by releasing the locking member of the hitch to allow the hitch to extend, thereby permitting the tractor to advance onto firm ground free of its load and when so advanced, pull the load through the extended hitch.

A further object is to construct the hitch in a simple, durable and inexpensive manner and so that it can be readily adjusted.

With the above more important and other minor objects in view which will become more apparent as the description proceeds, the invention consists essentially in the arrangement and construction of parts hereinafter more particularly described, reference being had to the accompanying drawings, in which:—

Fig. 1 is a plan view of the hitch as it appears connecting the draw bar of a tractor and the hitch bar of a plough.

Fig. 2 is an enlarged side view of the hitch.

Fig. 3 is an enlarged detailed vertical sectional view at 3—3 Figure 1.

Fig. 4 is a horizontal sectional view at 4—4 Figure 3.

Fig. 5 is an enlarged vertical cross sectional view at 5—5 Figure 3.

In the drawings like characters of reference indicate corresponding parts in the several figures.

The draw bar 1 of the pulling vehicle such as a tractor, is herein shown as connected by my hitch to the hitching bar 2 of an agricultural implement such as a plough. The hitch is now described in detail.

A stationary draft bar 6 is provided, this embodying spaced upper and lower arms 7 and 8 extending rearwardly from an open sided head 9, the head presenting a front end plate 10 and a vertically disposed sliding end plate 11. The arms are connected by a forward bolt 12 and this bolt passes through the forward end of an angularly disposed brace bar 13 extending between the arms and provided with a number of adjusting holes 14. The rear ends of the bars 7 and 8 span the hitching bar 2 and are connected thereto by a bolt 15. The bar 13 has the rear end thereof connected to the hitching bar by a bolt 16. The end plates 10 and 11 carry a sliding spindle 17 herein shown as non-circular in cross section and the rear end of the spindle is screw threaded to receive an adjusting nut 18 while the front end thereof, which extends in advance of the head 10, is forked and carries a pivot bolt 19. A coiled spring 20 is mounted on the spindle between the plates 10 and 11 and obviously this spring acts through the plate 11 to hold the spindle in its rearmost position and the tension of the spring can be adjusted by tightening up the nut 18.

On the bolt 19, I mount a locking member 21 in the form of an L-shaped hook, the hook hanging normally downwardly under the action of gravity and having a slanting or tapered lower end 22.

The under side of the head carries a guide in the form of a box 23 which is provided in the under side with a longitudinally extending slot 24 which is crossed more or less centrally of its length by a stop web 25. The box receives slidably a tubular draft bar 26 which is substantially rectangular in cross section and is provided in its under side with a centrally disposed longitudinally extending slot 27 open at the rear end of the bar 26 and closed adjacent the forward end of such bar.

The forward end of the bar 26 is provided centrally on the under side with a stop lug 28 slidably received in the forward end of the slot 24 and engageable in the back movement of the bar 26 with the cross web 25. The rear end of the bar 26 is provided with outstanding stop lugs 29 engageable with the rear end of the box 23. The lugs 28 and those 29 obviously limit the rear and forward positions of the tubular bar 26 in regard to the box.

The tubular draft bar 26 slidably receives a further draft bar 30 which is provided at its forward end with an eye 31 and at its rear end with a stop pin 32, the latter pin extending into the slot 27 and being designed to engage with the forward end of the slot in the forward pulling of the bar 30 and so limit the forward movement of the latter bar. The bar 30 is provided adjoining the eye with a lengthwise extending slot 33 and has opposing right angled shoulders 34 formed on the sides thereof in a location adjoining the inner end of the slot 33, these shoulders being designed in the in or rear movement of the bar 30 to engage with the forward end of the tubular bar 26. The slot 33 is adapted to receive the locking member 21.

On the under side of the box, I mount slidably a socket 35 which is provided with an extending spindle 36 passing slidably through a stationary arm 37 carried by the box. A coiled spring 38 is interposed between the socket and the arm 37 and the rear end of the spindle is screw threaded to receive an adjusting nut 39, the arrangement being such that the socket under the influence of the spring maintains a forward position as limited by the adjustment given the nut. The socket carries at its under side a downwardly extending lip 40. One adjusts the tension in the springs 20 and 38 by manipulating the nuts 18 and 39.

The device when operating under normal pulling conditions has a position as shown in the drawings and here it will be observed that the hook or locking member 21 is extending through the slot 33 and has the tip or lower end thereof entered in the socket. It will be apparent also that when the parts are in this position, a forward pull of the bar 30 causes through the locking member, a forward movement of the spindle 17 provided, of course, the lower end of the member 30 remains caught in the socket. The spring 20 can be adjusted by manipulating the nut 18 so that the locking member 21 will remain locked in the socket for all normal pulling conditions.

Should, however, an abnormal strain be developed such as by the plough engaging a damaging obstruction, the spring 20 will be compressed to such an extent and the spindle advanced so far that the free tip of the locking member 21 will escape from the socket. The instant this occurs, the bar 30 is released and as it moves forward with the advancing tractor to which it is attached by the bolt 41, the lower end of the member 21 will rise up through the slot and ride the upper face of the bar 30.

When the bar 30 has advanced to its extreme foremost position relative to the bar 26, the pin 32 will be engaged with the closed end of the slot 27 with the result that the bar 26 will then be pulled ahead by the bar 30 until in its extreme forward position, the pins 29 engage with the rear end of the box. I believe that by allowing the released tractor to advance say about eight feet, I provide ample time for the attendant to stop the tractor and the tractor should be stopped before the bar 26 has reached its limiting forward position.

After the tractor has been stopped, one will back the tractor and at such time, the various parts will return to their initial position and in this movement, it will be observed that the locking member 21 will re-enter the slot 33 and gravitate downwardly through the slot and will be forced by the front end of the slot 33 to re-enter the socket, the slanting end 22 of the locking member first engaging the inclined lip 40 and then forcing the socket back against the action of the spring until the end of the locking member passes into the socket. After the parts have resumed their normal position, the tractor can back the plough through the hitch, the plough can be cleared from the obstruction and the work can then again proceed.

A further advantage of this hitch is that when a tractor is drawing a load such as a plough, it is apt to become mired in mud, the load of the plough being too heavy for the tractor to clear itself and proceed. If a tractor becomes mired where my hitch is employed, it is only necessary for the attendant to tighten up the nut 39 sufficient to withdraw the socket to permit the lower end of the locking member 21 to clear from the socket. This having been done, the tractor is freed of the load and can advance onto firmer ground from its mired position.

The advanced tractor having then good traction at its wheels, can then pull the load ahead and at such time, the bars 30 and 26 will be in their most advanced positions, the bar 30 being stopped by the pin 32 and the bar 26 by the lugs 21. Subsequently the parts will be reset in their normal position by backing up the tractor and then resetting the socket in its proper position, that is, in a position where it will retain the lower end of the locking element 21 under all normal load pulling conditions.

While I have given a detailed description of the various parts, it will be understood that the structures thereof can be readily modified without departing from the spirit of my invention as set forth in the appended claims.

What I claim as my invention is:—

1. The combination with a pulling vehicle and a drawn implement, of a hitch connecting the vehicle to the implement and comprising a rear draft bar attached to the implement, a plurality of sliding draft bars carried by the forward end of the rear bar, one of said sliding bars having its forward end connected to the vehicle and being provided adjoining such front end with a locking slot, means limiting the forward movement of the sliding draft bars in regard to one another and to the rear draft bar, a spindle slidably carried by the forward end of the rear draft bar, an adjustable spring resisting the forward end movement of the spindle, a locking member pivotally carried by the forward end of the spindle and passing normally downwardly through the slot and having the lower end thereof turned rearwardly and a socket carried by the forward end of the rear bar and receiving the rearwardly turned end of the locking member.

2. The combination with a pulling vehicle and a drawn implement, of a hitch connecting the vehicle to the implement and comprising a rear draft bar having the rear end attached to the implement, a tubular draft bar slidably carried by the forward end of the rear draft bar and having a limiting forward and rear position, a front draft bar connected to the vehicle and slidably carried by the tubular draft bar and having a limiting forward and rear position and being provided at its forward end with a locking slot, a spindle slidably carried by the forward end of the rear draft bar, an adjustable spring associated with the spindle and resisting forward movement thereof, a hook shaped locking member pivotally carried by the forward end of the spindle and passing normally downwardly through the slot and having the lower end thereof back turned and a socket carried by the forward end of the rear bar and normally receiving the back turned end of the locking member.

3. The combination with a pulling vehicle and a drawn implement, of a hitch connecting the vehicle to the implement and comprising a rear draft bar having the rear end attached to the implement, a tubular draft bar slidably carried by the forward end of the rear draft bar and having a limiting forward and rear position, a front draft bar connected to the vehicle and slidably carried by the tubular draft bar and having a limiting forward and rear position and being provided at its forward end with a locking slot, a spindle slidably carried by the forward end of the rear draft bar, an adjustable spring associated with the spindle and resisting forward movement thereof, a hook shaped locking member pivotally carried by the forward end of the spindle and passing normally downwardly through the slot and having the lower end thereof back turned, a socket slidably carried by the forward end of the rear bar and normally receiving the lower back turned end of the locking member and adjustable spring means for yieldingly holding the socket in a selected forward position.

Signed at Belmont, Manitoba, this 25th day of June, 1930.

JOSEPH LARAMEE.